(12) United States Patent
Naylor et al.

(10) Patent No.: US 7,110,179 B2
(45) Date of Patent: Sep. 19, 2006

(54) POLARIZERS AND ISOLATORS AND METHODS OF MANUFACTURE

(75) Inventors: Amy J. Naylor, Jasper, NY (US); Jessica L. Neumann, Corning, NY (US); Robert S. Pavlik, Jr., Corning, NY (US); Katherine R. Rossington, Corning, NY (US); Robert Sabia, Corning, NY (US); Donald M. Trotter, Jr., Newfield, NY (US)

(73) Assignee: Corning Incorporated, Corning, NY (US)

( * ) Notice: Subject to any disclaimer, the term of this patent is extended or adjusted under 35 U.S.C. 154(b) by 661 days.

(21) Appl. No.: 10/328,132

(22) Filed: Dec. 19, 2002

(65) Prior Publication Data

US 2004/0172974 A1    Sep. 9, 2004

(51) Int. Cl.
*G02B 5/30*    (2006.01)
(52) U.S. Cl. .................. 359/492; 359/485; 359/490
(58) Field of Classification Search ............ 359/485, 359/486, 490, 491, 492
See application file for complete search history.

(56) References Cited

U.S. PATENT DOCUMENTS

| | | | | |
|---|---|---|---|---|
| 3,540,793 | A | 11/1970 | Araujo et al. | 350/147 |
| 4,125,404 | A | 11/1978 | Araujo et al. | 106/54 |
| 4,304,584 | A | 12/1981 | Borrelli et al. | 65/30.11 |
| 4,479,819 | A | 10/1984 | Borelli et al. | 65/30.11 |
| 4,891,336 | A | 1/1990 | Prassas | 501/13 |
| 4,908,054 | A | 3/1990 | Jones et al. | 65/30.11 |
| 4,980,318 | A | 12/1990 | Araujo | 501/13 |
| 5,007,948 | A | 4/1991 | Araujo | 65/30.13 |
| 5,023,209 | A | 6/1991 | Grateau et al. | 501/13 |
| 5,252,524 | A | 10/1993 | Borrelli et al. | 501/56 |
| 5,281,562 | A | 1/1994 | Araujo et al. | 501/32 |
| 5,322,819 | A | 6/1994 | Araujo et al. | 501/13 |
| 5,375,012 | A | 12/1994 | Borrelli et al. | 359/485 |
| 5,426,077 | A | 6/1995 | Brocheton et al. | 501/13 |
| 5,430,573 | A | 7/1995 | Araujo et al. | 359/361 |
| 5,517,356 | A | 5/1996 | Araujo et al. | 359/490 |
| 5,540,745 | A | 7/1996 | Havens et al. | 65/32.1 |
| 5,625,427 | A | 4/1997 | Araujo et al. | 351/159 |
| 5,627,676 | A | 5/1997 | Borrelli et al. | 359/494 |
| 5,864,427 | A * | 1/1999 | Fukano et al. | 359/492 |
| 5,886,820 | A | 3/1999 | Tajima et al. | 359/492 |
| 5,932,501 | A | 8/1999 | Brocheton | 501/64 |
| 5,943,156 | A * | 8/1999 | Komuro et al. | 359/280 |
| 6,058,738 | A | 5/2000 | Gill et al. | 65/30.1 |
| 6,089,042 | A | 7/2000 | Gill et al. | 65/30.1 |
| 6,124,038 | A | 9/2000 | Araujo | 428/427 |
| 6,158,246 | A | 12/2000 | Borrelli et al. | 65/30.1 |
| 6,167,727 | B1 | 1/2001 | Tajima et al. | 65/30.1 |
| 6,171,762 | B1 | 1/2001 | Borrelli et al. | 430/314 |
| 6,221,480 | B1 | 4/2001 | Borrelli et al. | 428/325 |
| 6,252,709 | B1 * | 6/2001 | Sato | 359/492 |
| 6,298,691 | B1 | 10/2001 | Borrelli et al. | 65/30.1 |
| 6,309,753 | B1 | 10/2001 | Grossman et al. | 428/428 |
| 6,313,947 | B1 | 11/2001 | Takahashi et al. | 359/492 |

FOREIGN PATENT DOCUMENTS

| | | |
|---|---|---|
| EP | 0719741 | 7/1996 |
| EP | 0719742 | 7/1996 |

(Continued)

*Primary Examiner*—John Juba, Jr.
(74) *Attorney, Agent, or Firm*—Timothy M. Schaeberle

(57) ABSTRACT

Polarizing glass articles, optical isolators including polarizing glass articles, and methods of manufacturing polarizing glass articles and optical isolators are disclosed. The methods manufacture can be used to manufacture isolators exhibiting improved contrast ratio.

11 Claims, 3 Drawing Sheets

FOREIGN PATENT DOCUMENTS

JP 07-010568 A * 1/1995

JP 08-231241 A * 9/1996

* cited by examiner

POLARIZERS AND ISOLATORS AND METHODS OF MANUFACTURE

FIELD OF THE INVENTION

This invention relates to polarizing glass articles, methods of manufacturing such articles and devices including such articles.

BACKGROUND OF THE INVENTION

A polarizing effect can be obtained in glasses containing metal halide crystals such as silver halide, copper halide, or copper-cadmium halide crystals. These crystals can be precipitated in glasses including, but not limited to borosilicate glasses having compositions containing suitable amounts of an indicated metal and a halogen according to processes known in the art.

The polarizing effect is generated in these crystal-containing glasses by stretching the glass, and then exposing the surface of the stretched glass to a reducing atmosphere. The glass is placed under stress, typically at a temperature above the glass annealing temperature to elongate the glass, thereby elongating and orienting the crystals. The elongated article is then exposed to a reducing atmosphere at a temperature above about 250° C., but not more than about 100° C. above the glass annealing point. This develops a surface layer in which at least a portion of the halide crystals are reduced to elemental metal, for example, silver or copper. Examples of processes for the production of polarizing glass are described in detail in U.S. Pat. Nos. 4,304,584 and 4,479,819, the contents of which are incorporated herein by reference.

Polarizing glasses of the type described above are used to make polarizing elements that are used in equipment including but not limited to optical communication equipment, optical recording equipment, optical sensors, and optical interferometers. Optical isolators, which are used in optical communication systems, typically include a first polarizer, a Faraday rotator, and a second polarizer arranged on an optical axis in a holder. Two major uses of optical isolators are in optical transmission systems and in fiber-optic amplifiers.

One function of optical isolators is to prevent light from traveling backwards in optical transmission systems that include a light source such as a laser. An isolator is usually placed in the path of forward traveling light to prevent "back reflections" or backward traveling light. For example, a back reflection can occur in optical fiber systems when light transmitted from a light source such as a laser encounters an irregularity such as a change in refractive index between abutting materials or misalignment of optical fibers in the system. Back reflections result in reduced performance of the system and sometimes can adversely affect the transmission source, which is usually a laser. Isolators permit light traveling in only a forward direction from a light source to pass while preventing light from being reflected back to the light source. Although various methods exist for producing polarizing glass articles and optical isolators, it would be desirable to provided improved methods of manufacture.

SUMMARY OF INVENTION

Some embodiments of the invention relate to polarizing glass articles, and other embodiments relate to optical isolators employing polarizing glass articles. Other embodiments relate to methods of manufacturing polarizing glass articles. The methods of manufacture can be used to manufacture isolators exhibiting improved isolation or contrast ratio.

Advantages of the invention will be evident from the following detailed description. It is to be understood that both the foregoing general description and the following detailed description are exemplary and are intended to provide further explanation of the invention as claimed.

DETAILED DESCRIPTION

According to certain embodiments of the invention, the performance of polarizing glass articles and optical isolators which can be used in optical communications systems is optimized. Polarizing glass articles having improved polarization axis uniformity and optical isolators having improved contrast ratio are provided.

Figure 1A:
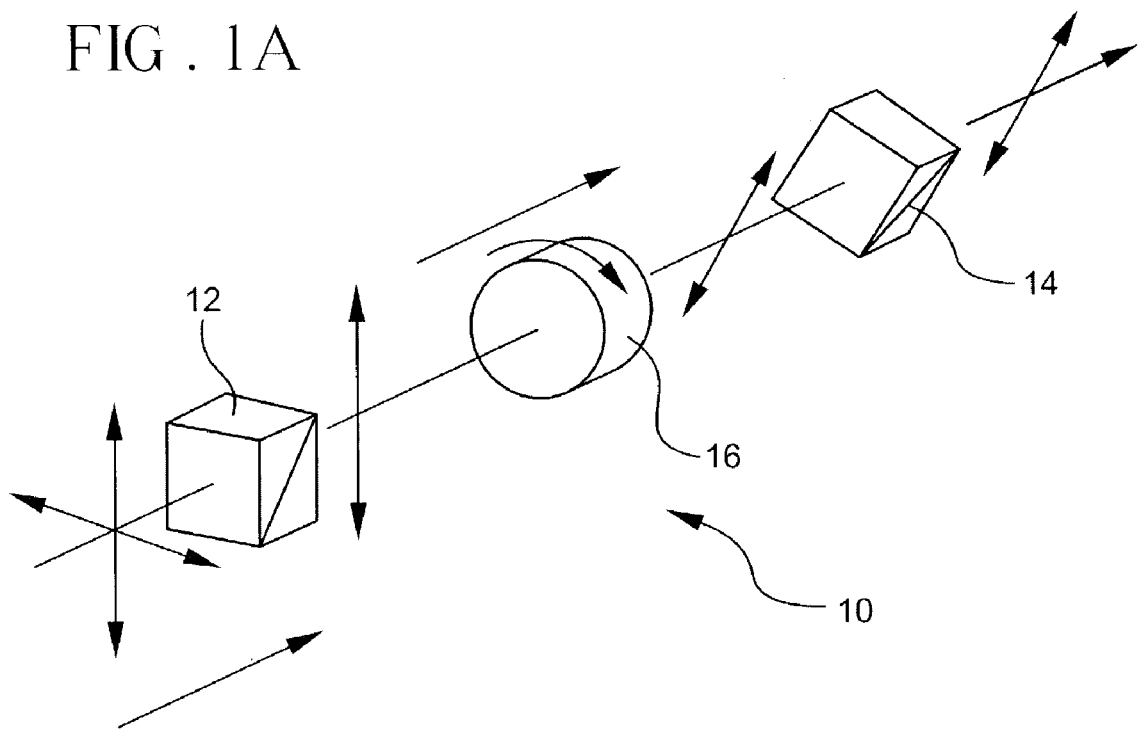
FIGS. 1A and 1B show light passing through a polarization dependent optical isolator including a polarizing article according to one embodiment of the invention.
Figure 1B:
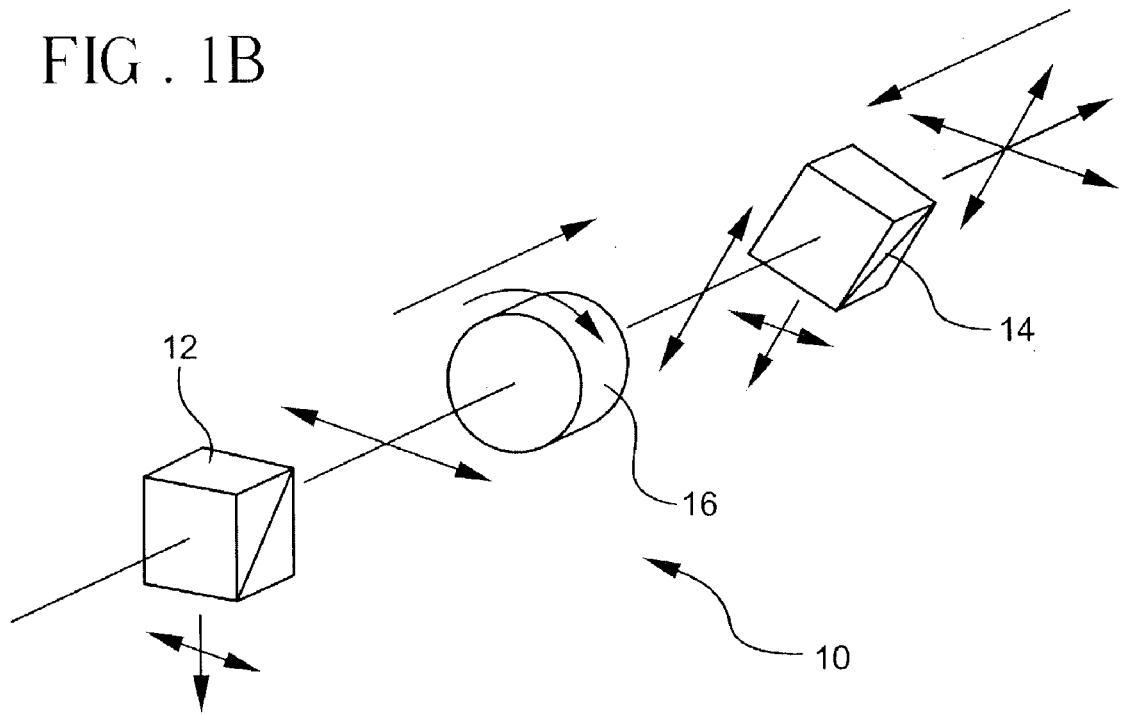

FIGS. 1A and 1B show a typical polarization-dependent optical isolator 10. The optical isolator 10 consists of two polarizers 12, 14, a first polarizer 12 and a second polarizer 14, often called an analyzer, the two polarizers having a 45° differential in the direction of their light transmission axis. The isolators also include a 45° Faraday rotator 16 interposed between the polarizers. When forward-directed light passes through the first polarizer 12, the incident light is transformed into linearly polarized light, and when the light passes through the Faraday rotator 16, the polarization plane of the linearly polarized light is rotated 45°. The linearly polarized light passes through the analyzer 14 without loss since the light's polarization plane is now in the same direction as the light transmission axis of the analyzer, which is tilted 45° from the polarizer in the direction of the Faraday rotation. Backward-directed light, upon passing through the analyzer 14, is transformed into linearly polarized light with a 45° tilt in the transmission axis, and when passing through the Faraday rotator, the polarization plane of the backward light is rotated 45° in the same direction as the initial tilt. The backward light is nearly completely extinguished by the polarizer because the backward light's polarization plane is now 90° away from the light transmission axis of the polarizer.

It has been discovered that the polarization axis of some polarizing glass containing elongated metal particles is not uniformly oriented across the surface of the glass sheet or layer. In other words, the polarization axis angularly changes slightly as a function of linear displacement or position across the surface of a polarizing glass sheet. According to the prior art, the change in polarization axis across a square 8 mm×8 mm sheet of Polarcor™ glass polarizer has been measured to be as high as about 0.35°, which is a change in polarization axis of 0.043°/mm. According to certain embodiments of the invention, improved polarizing glass sheets can be produced that exhibit a change in polarization axis of 0.0375°/mm, which would be about 0.3° over distance of 8 mm. According to certain embodiments of the invention, improved polarizing glass sheets can be produced that exhibit a change in polarization axis of about 0.030°/mm for sheet sizes of 8 mm×8 mm, 11 mm×11 mm, 15 mm×15 mm and 30×30 mm. Polarization angle variation is calculated by multiplying the displacement across a sheet of glass by the change in polarization axis. Thus, it is possible to produce 8 mm×8 mm polarizing glass sheets that exhibit a polarization angle variation of 0.24° across the sheet, 11 mm×11 mm sheets exhibit a polarization angle variation of 0.33° across the sheet, 15 mm×15 mm sheets that exhibit a polarization angle variation of 0.45° across the entire sheet, and 30 mm×30 mm sheets that exhibit a change in polarization axis of 0.9 across the sheet. Improved polarizing glass sheets having dimensions up to 30 mm×30 mm exhibiting a change in polarization axis of about 0.020°/mm, or a polarization angle variation of 0.16° across a 8 mm×8 mm sheet, 0.3° across a 15 mm×15 mm sheet, and 0.6° across a 30 mm×30 mm sheet can be produced according to certain embodiments of the invention.

According to certain embodiments of the invention, standard processes for manufacturing polarizing glass articles can be modified to change manufacturing parameters such as the temperature profile across the surface of the glass and/or the stress during drawing of the polarizing glass article to minimize the polarization axis variability of samples. While the present invention should not be limited to a particular theory, it is believed that the polarization angle variability is due to the fact that the long axis of the metallic particles in the polarizing glass are not parallel across the surface of a sample due in part to non-uniform stress and/or temperature during manufacture of the glass.

Figure 2:
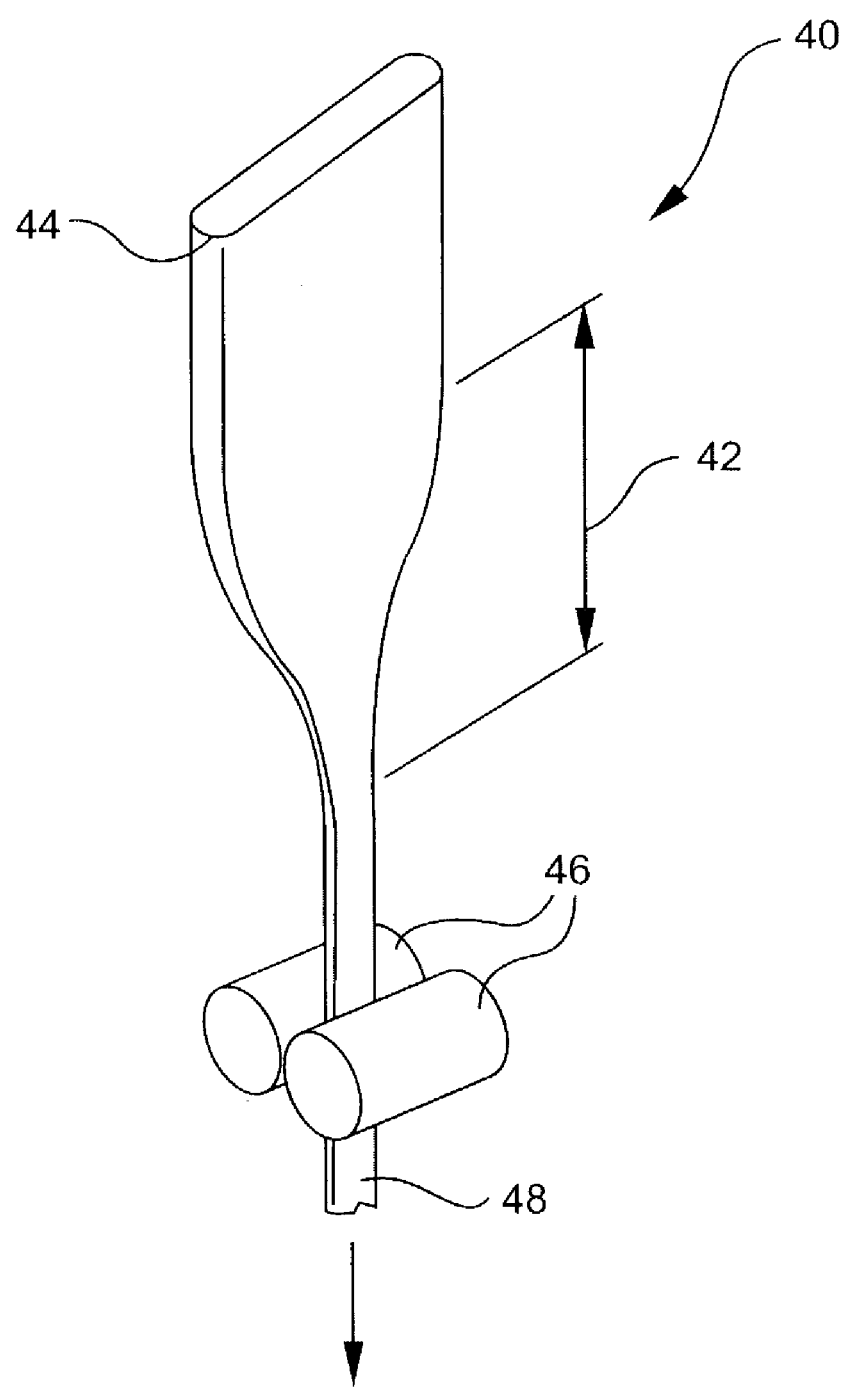
FIG. 2 is a schematic view of a method of manufacturing a polarizing glass article according to one embodiment of the invention.

FIG. 2 shows a typical apparatus 40 for manufacturing polarizing glass articles. The apparatus 40 includes a heated zone 42, which is typically provided by the drawing furnace as is known in the art of forming polarizing glass sheets of material. Glass preform 44 containing metallic halide crystals is passed through the heated zone 42 and stretched under tension by pulling rollers 46 to form a stretched glass sheet 48. Applicants have performed experiments that indicate that the stress or tension across the surface of the glass is not uniform in a direction generally perpendicular to the applied stress during drawing of the glass (i.e., across the width of the sheet being drawn). It is believed that by adjusting the temperature of the heated zone 42 and by adjusting the stress or tension applied to the glass during drawing such that the stress can be made more nearly uniform in a direction generally perpendicular to the direction of the stress, i.e. across the width of the sheet.

According to certain embodiments of the invention, the polarization angle variability of polarizing glass sheets can be decreased by drawing glass sheets, measuring the polarization angle variability and adjusting the draw stress or tension and temperature to decrease the polarization angle variability. The method includes elongating a glass article containing metal halide crystals under stress at an elevated temperature to elongate the crystals in the direction of the stress and then exposing the elongated glass article to a reducing atmosphere at an elevated temperature to initiate reduction of the crystals to metal. After the article has been formed, the angular change in polarization axis in a direction generally perpendicular to the direction of the applied stress between a distance L is measured. Then, at least the temperature profile and/or the stress profile of the process for manufacturing the glass can be adjusted in a manner such that the change in polarization axis between the distance L is decreased. This sequence of steps can be repeated until the polarization angle variability is decreased to an acceptable value. In certain preferred embodiments, the stress or tension can be adjusted such that the stress across the glass during drawing is uniform in a direction generally perpendicular to the direction of elongation of the glass.

In certain preferred embodiments, the polarization angle variability across a distance of at least 8 mm of a glass sheet is less than about 0.3°, which could also be expressed as less than about 0.0375°/mm. In other preferred embodiments, the change in polarization axis across a distance of at least 8 mm is less than 0.1°, which could also be expressed as less than about 0.0125°/mm. In other embodiments, the change in polarization axis between a distance L of at least 15 mm is less than about 0.3°, which could be express as less than about 0.02°/mm. In still other embodiments, the change in polarization axis is less than about 0.1° over a distance of 15 mm, which could also be expressed as less than about 0.0067°/mm.

Polarization angle variability in polarizing glass sheets will affect the contrast ratio of isolators that incorporate such sheets. While the variability can be compensated for by actively aligning the polarizers, active alignment is time consuming and requires expensive equipment, increasing the manufacturing cost of the isolators. Ideally, it would be advantageous if large sheets of polarizers sandwiching a Faraday rotator could be passively aligned and laminated to provide isolators having an acceptable contrast ratio or isolation value.

Figure 3:
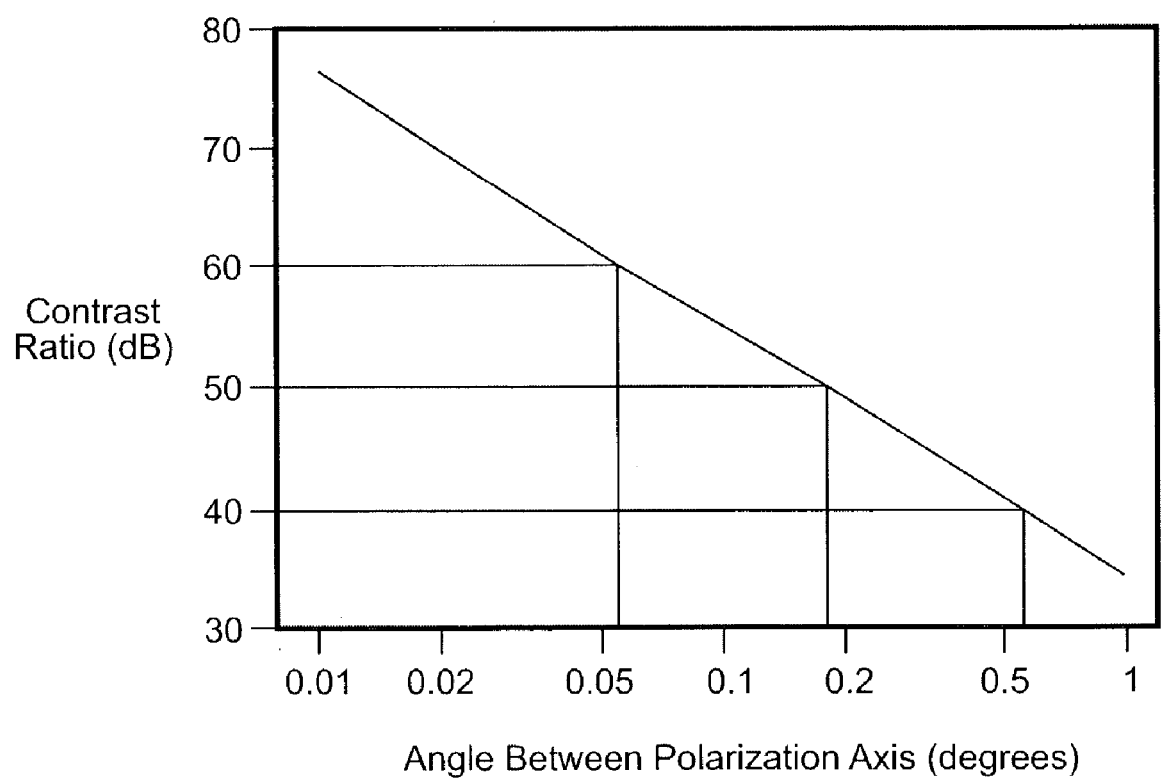
FIG. 3 is a graph of contrast ratio versus angle between polarization axis for two sheets of polarizing glass according to one embodiment of the invention.

Referring now to FIG. 3, which is a graph of contrast ratio or isolation versus angle between polarization axis of two polarizers laminated together at about 90° with respect to each other. The angle between polarization on the X-axis represents a worst case of two polarizers having an equal polarization angle variability. Thus, in a best case scenario, if the polarizers were perfectly aligned and had no polarization angle variability, the contrast ratio would be a function of the contrast ratio of the two polarizers, which would be equivalent to the polarizer with the highest contrast ratio. If the polarization angle variability of each sample were 0.10°, and if the polarizers were perfectly aligned at one selected location, there would be regions in which the angle between polarization axis of the two samples would be two times 0.10° or 0.20°. The graph shows that such a sample would limit the maximum isolation or contrast ratio to about 50 dB. Similarly, if polarization angle variability of each polarizer was about 0.29° and the angle between polarization of two perfectly aligned polarizers was about 0.58°, then the isolation or contrast ratio would be about 40 dB.

Thus, according to certain embodiments of the invention passively aligned optical isolators can be provided by laminating layers of material including two polarizing glass layers sandwiching a Faraday rotator layer, wherein the contrast ratio of the isolator is greater than about 40 dB. In some preferred embodiments, the layers have a length and a width of at least 8 mm, and in other preferred embodiments, the layers have a length and a width of at least 15 mm. In certain preferred embodiments, passively aligned optical isolators exhibiting an isolation or contrast ratio greater than about 50 dB are provided. In certain embodiments, the isolators are provided by laminating together sheets of polarizing glass with a Faraday rotator, wherein the sheets have a length and a width of at least 8 mm, and in some embodiments, the length and width is about 15 mm. After larger sheets of isolators are manufactured, smaller, typically 0.5×0.5 mm or 2×2 mm squares of isolators can be cut from the larger sheet. Methods for laminating and directly bonding sheets of material to manufacture optical isolators are described in commonly assigned U.S. patent application Ser. No. 10/139,664, filed on May 2, 2002, entitled "Optical Isolators and Methods of Manufacture," the contents of which are incorporated herein by reference.

According to other embodiments of the invention, optical isolators having improved isolation or contrast ratio can be provided by drawing a sheet of polarizing glass containing elongated metallic halide crystals and reducing the metallic halide crystals. After the sheet is produced, the polarization angle variability is measured with respect to a distance across the sheet, and the polarization angle variability is referenced with respect to at least one edge of the sheet. Once the polarization angle variability is known across the sheet, an area of the glass sheet exhibiting minimum polarization angle variability can be selected. The area of glass is preferably selected such that the area cut from the sheet can be used to passively align the sheet with another polarizing glass sheet to produce an optical isolator having a contrast ratio greater than 40 dB.

It will be apparent to those skilled in the art that various modifications and variations can be made to the present invention without departing from the spirit or scope of the invention. Thus, it is intended that the present invention covers modifications and variations of this invention provided they come within the scope of the appended claims and their equivalents.

What is claimed is:

1. A polarizing glass article comprising a glass matrix containing elongated metal particles exhibiting a change in polarization axis of less than about 0.0375°/mm as measured across a major surface of the article at points separated by at least 8 mm.

2. A polarizing glass article according to claim 1, exhibiting a change in polarization axis over at least 8 mm that is less than about 0.16°.

3. The polarizing glass article of claim 1, wherein the change in polarization axis over a distance of at least 15 mm is less than about 0.3°.

4. The polarizing glass article of claim 1, wherein the change in polarization axis over a distance of at least 30 mm is less than about 0.6°.

5. The polarizing glass article according to claim 1 wherein said change in polarization axis is less than about 0.0067°/mm.

6. The polarizing glass article according to claim 5 wherein said points are separated by at least 15 mm.

7. A polarizing glass article in the form of a glass sheet containing elongated metal particles exhibiting a change in polarization axis of 0.030°/mm over a distance of at least 8 mm, as measured across a major surface of said sheet.

8. The polarizing glass article according to claim 7, exhibiting a change in polarization axis over at least 8 mm that is less than about 0.16°.

9. The polarizing glass article according to claim 7, exhibiting a change in polarization axis over at least 30 mm that is less than about 0.6°.

10. The polarizing glass article of claim 7, wherein said change in polarization axis is 0.0067°/mm.

11. The polarizing glass article of claim 10, wherein said distance is 15 mm.

* * * * *